United States Patent [19]
Martin

[11] 3,861,285
[45] Jan. 21, 1975

[54] COFFEE MAKING MACHINE CONVERTIBLE BETWEEN FUNNEL-FILTER OPERATION AND POUCH PACK OPERATION

[75] Inventor: John C. Martin, Springfield, Ill.

[73] Assignee: Bunn-O-Matic Corporation, Springfield, Ill.

[22] Filed: Aug. 2, 1973

[21] Appl. No.: 385,032

Related U.S. Application Data
[62] Division of Ser. No. 252,269, May 11, 1972, Pat. No. 3,793,935.

[52] U.S. Cl. ............................. 99/295, 99/304
[51] Int. Cl. ............................. A47j 31/14
[58] Field of Search ............... 99/295, 279, 282–283, 99/284–295, 302, 304, 307, 318, 323; 210/232, 474, 476; 141/331–332, 340, 343; 222/460–461, 462, 470, 181; 232/43; 248/44

[56] References Cited
UNITED STATES PATENTS

| | | | |
|---|---|---|---|
| 2,404,130 | 7/1946 | Frank | 248/94 X |
| 2,529,395 | 11/1950 | Hummel | 99/302 P |
| 2,905,418 | 9/1959 | Escartin | 248/94 |
| 3,343,478 | 9/1967 | Hausam | 99/283 |
| 3,369,477 | 2/1968 | Vittoe | 99/282 |
| 3,470,812 | 10/1969 | Levinson | 99/295 |
| 3,620,155 | 11/1971 | Bixby, Jr. | 99/295 |

FOREIGN PATENTS OR APPLICATIONS

| | | | |
|---|---|---|---|
| 608,305 | 9/1960 | Italy | 99/279 |

Primary Examiner—Harvey C. Hornsby
Assistant Examiner—Arthur O. Henderson
Attorney, Agent, or Firm—Robert R. Lockwood

[57] ABSTRACT

Coffee making machine can be used with a ground coffee funnel-filter combination or a funnel-pouch pack combination on provision of an adapter.

When used in the funnel-pouch pack mode a spray head assembly bears against a ground coffee pouch positionable at different levels in a funnel to force hot water through the pouch for maximum brewing efficiency. A valve in the air vent line is closed when the cold water supply valve is opened to force the hot water to flow through the ground coffee pouch. Except for the ground coffee receiving apparatus, the spray head and the valve in the air vent line, essentially the remaining apparatus is common to both systems.

5 Claims, 12 Drawing Figures

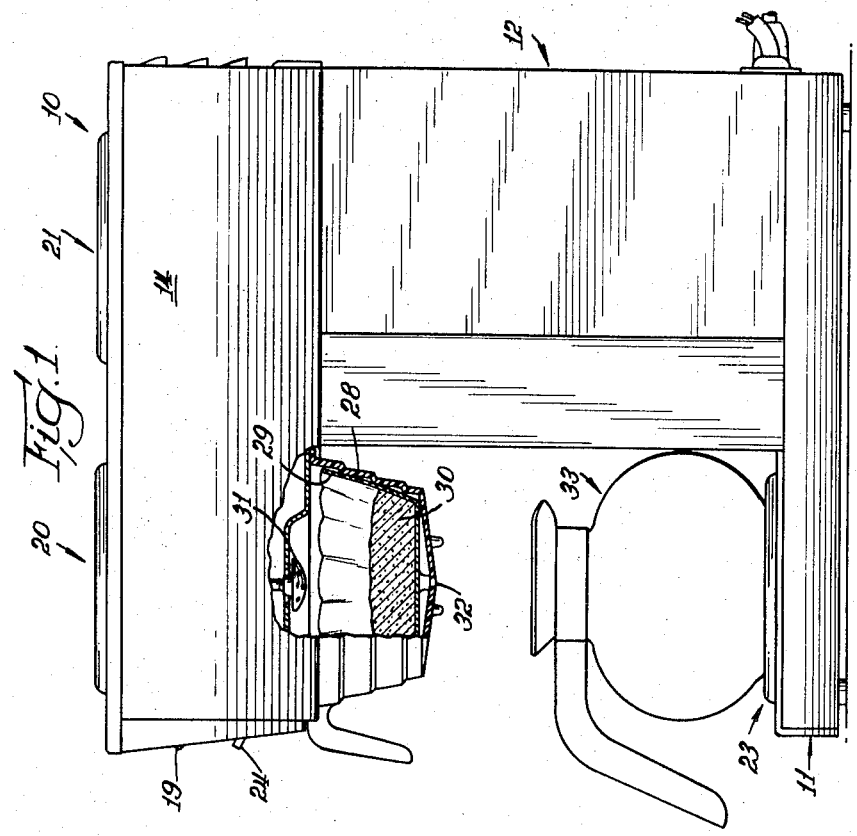
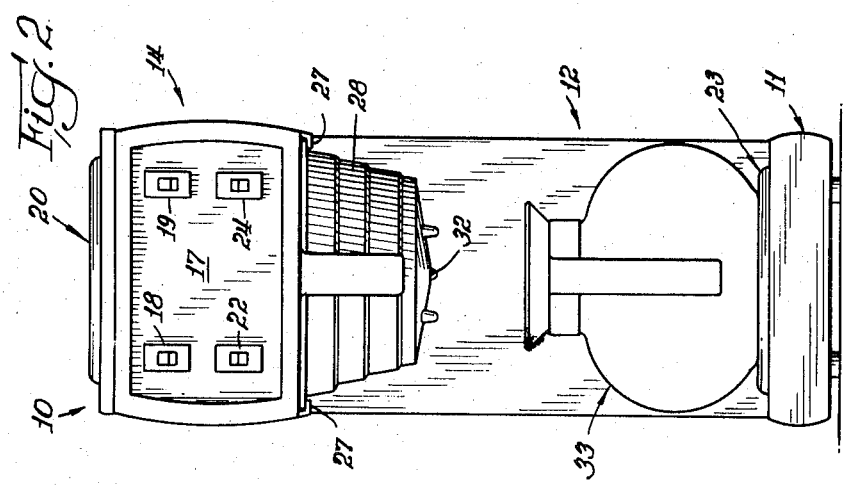

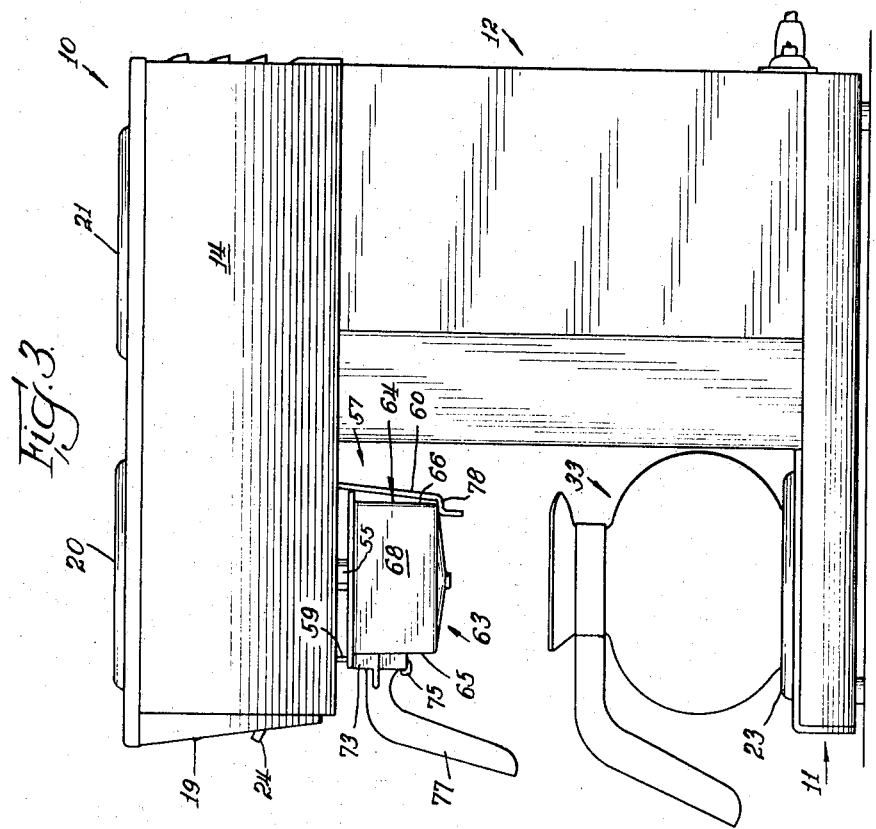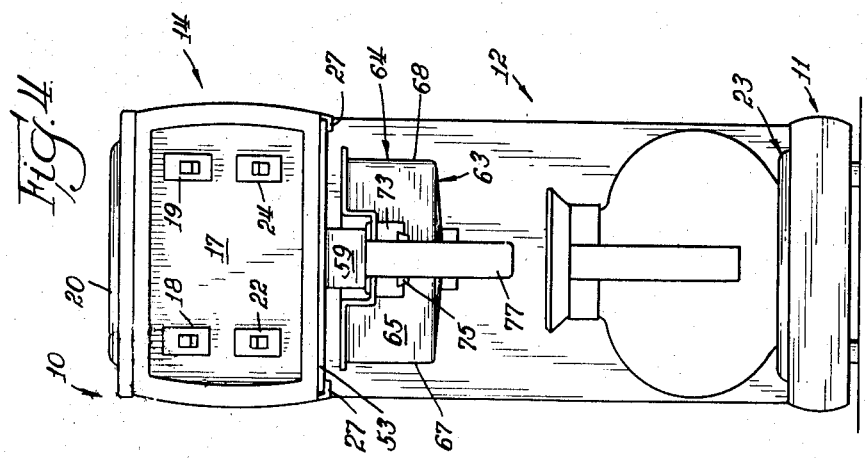

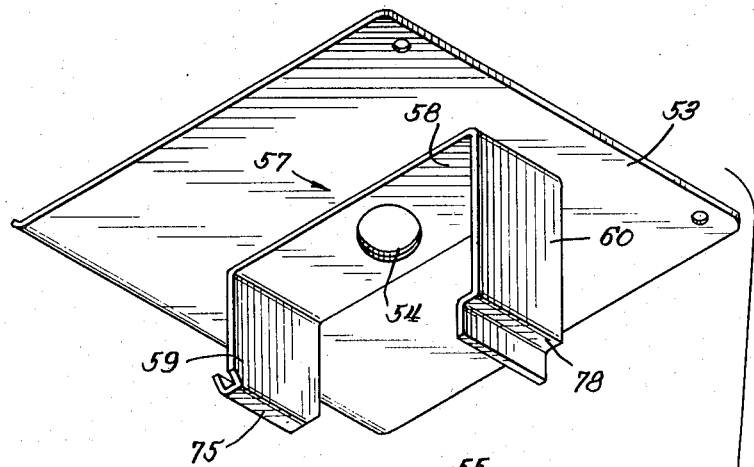
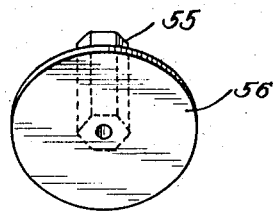
Fig. 5.
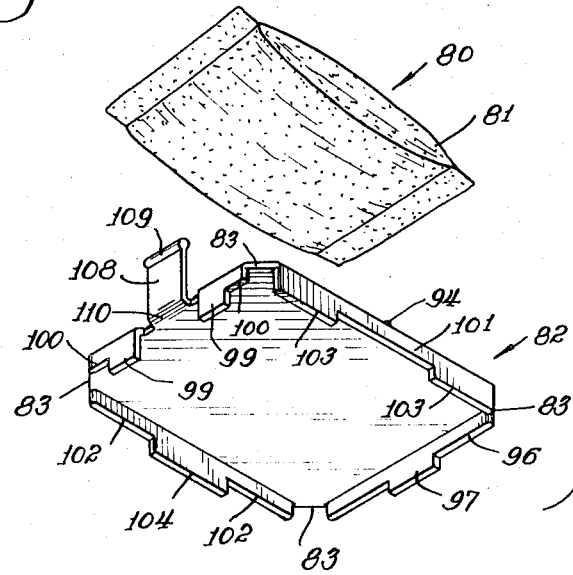

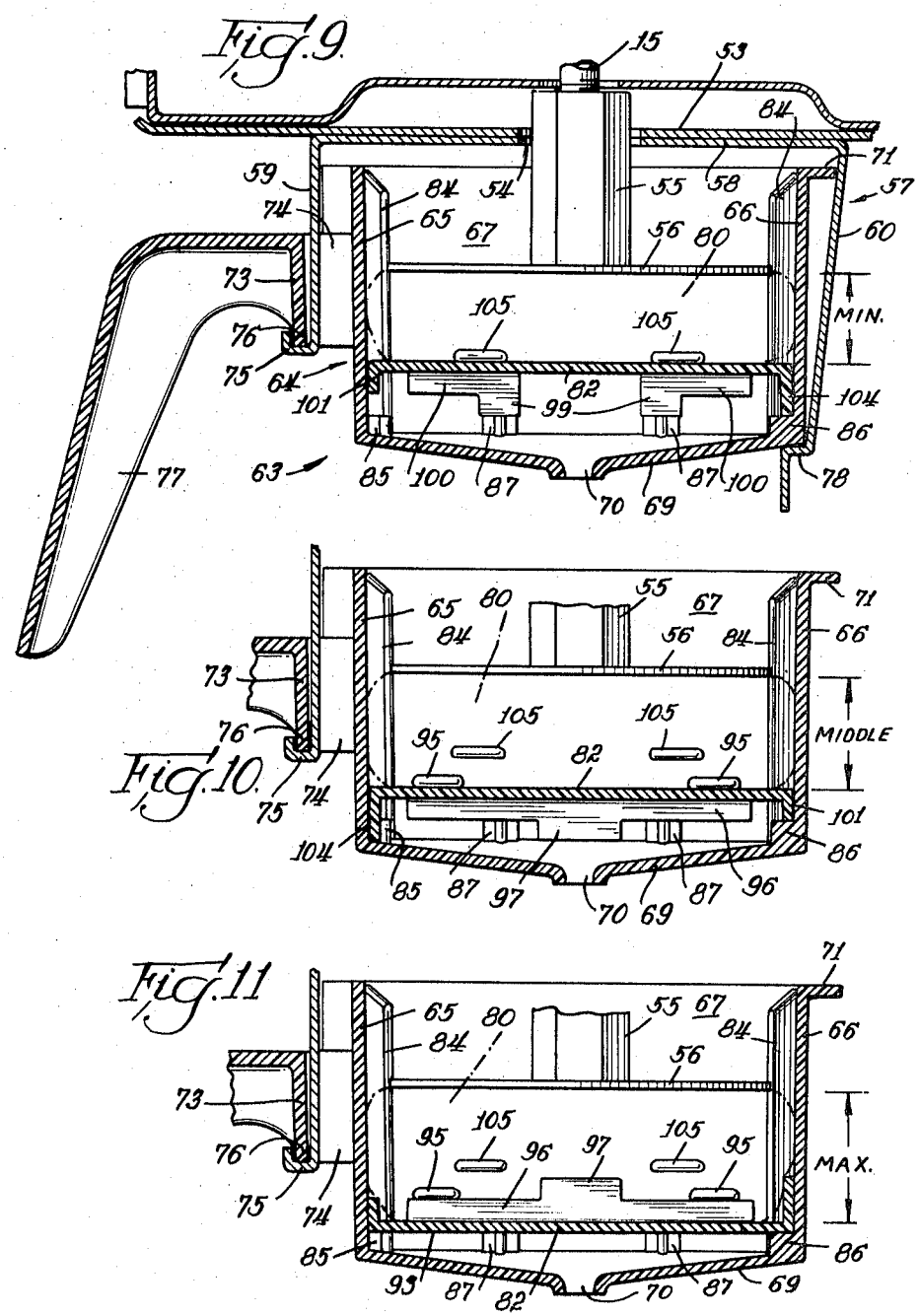

COFFEE MAKING MACHINE CONVERTIBLE BETWEEN FUNNEL-FILTER OPERATION AND POUCH PACK OPERATION

This is a division, of application Ser. No. 252,269, filed May 11, 1972 now U.S. Pat. No. 3,793,935.

This invention constitutes an improvement over the constructions disclosed in U.S. Pat. Nos. 3,100,434, issued Aug. 13, 1963; U.S. Pat. No. 3,450,024, issued June 17, 1969; and U.S. Pat. No. 3,610,132, issued Oct. 5, 1971.

Among the objects of this invention are: To provide a coffee making machine capable of being converted from a funnel-filter machine to a funnel-pouch pack machine while employing to a great extend the same apparatus, to provide for converting a funnel-filter coffee making machine to a funnel-pouch coffee making machine, except for the ground coffee receiving means; to provide for forcing hot water to flow under pressure through the pouch pack; to close off the air vent line used for the funnel-filter operation when the machine is employed with the funnel-pouch; and to accommodate different sizes of ground coffee pouches in the same funnel.

In the drawings:

FIG. 1 is a view, in side elevation, of a convertible coffee making machine constructed in accordance with this invention and illustrating how it can be employed with a funnel provided with a filter for receiving ground coffee.

FIG. 2 is a view, in front elevation, of the machine shown in FIG. 1.

FIG. 3 is a view, similar to FIG. 1, showing the machine modified to receive a pouch pack funnel.

FIG. 4 is a view, in front elevation, of the machine shown in FIG. 3.

FIG. 5 is an exploded view, in perspective, showing certain elements employed in the pouch pack modification.

FIG. 9 is a vertical section view of the pouch pack funnel in place on the funnel support and illustrating how a pouch pack of ground coffee having a minimum thickness can be accommodated.

FIG. 10 is a view, similar to FIG. 9, and illustrates the position of the removable plate adapted to receive a pouch pack of intermediate thickness.

FIG. 11 is a view, similar to FIG. 9, and shows the position of the removable plate to accommodate a pouch pack of maximum thickness.

Figure 6:
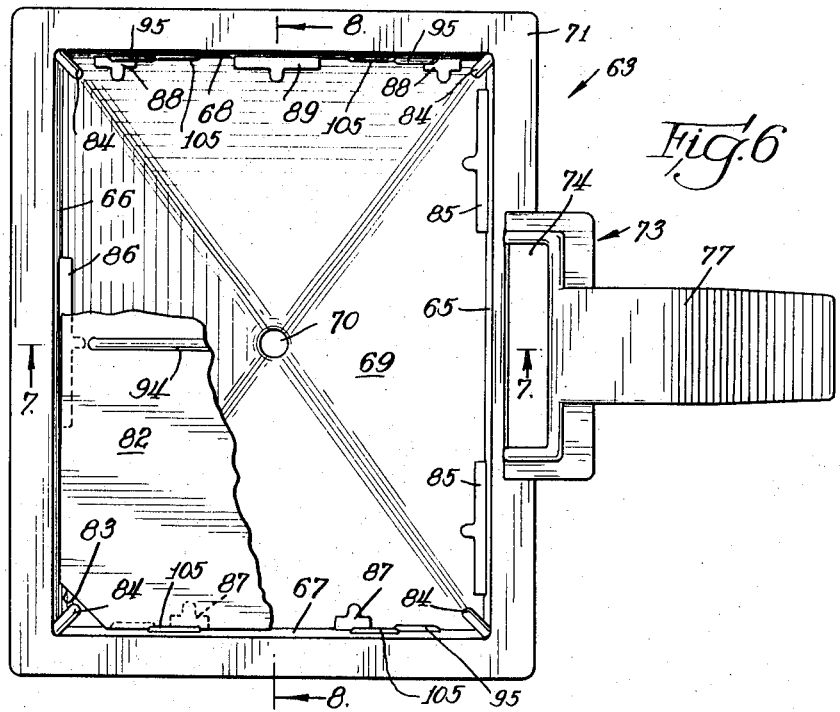
FIG. 6 is a top plan view of the pouch pack funnel.

Referring now particularly to FIGS. 1, 2, 3 and 4 it will be observed that the reference character 10 designates, generally, a convertible coffee making machine which can be employed in either of the two modes above referred to. The coffee making machine 10 includes a base that is indicated, generally, at 11 which is provided at one end with an upright housing 12 which contains, among other elements, a hot water tank 13, FIG. 12, the upper end of which extends into the overlying portion of a horizontal housing 14 in which are located a discharge hot water line 15 and an air vent line 16. It will be understood that certain controls are located in the upright housing 12 and in the horizontal housing 14.

A front panel 17 closes off the front end of the horizontal housing 14. On it are located warmer control switches 18 and 19 that are arranged to control the energization of warmers 20 and 21 which are located on the upper side of the horizontal housing 14. The circuit connections for the control switches 18 and 19 and the warmers 20 and 21 are not shown herein. Also mounted on the panel 17 is a control switch 22 for a warmer 23 in the base 11. A start switch 24 also is located on the front panel 17. The circuit connections for the control switch 22, warmer 23 and start switch 24 are shown in FIG. 12 and are referred to hereinafter.

Mounted on the underside of the front end portion of the horizontal housing 14 is a pair of funnel supporting rails 27. It will be understood that the rails 27 are common to both modes of operation of the coffee making machine 10. As illustrated in FIGS. 1 and 2 a funnel 28 is slidably mounted on the rails 27. The funnel 28 is provided with a filter 29 for receiving ground coffee 30 to be infused by hot water from a spray head 31 in accordance with conventional practice. An aperture 32 in the bottom wall of the funnel 28 directs the flow of coffee extract into a beaker 33 therebelow and mounted on the warmer 23.

Figure 12:
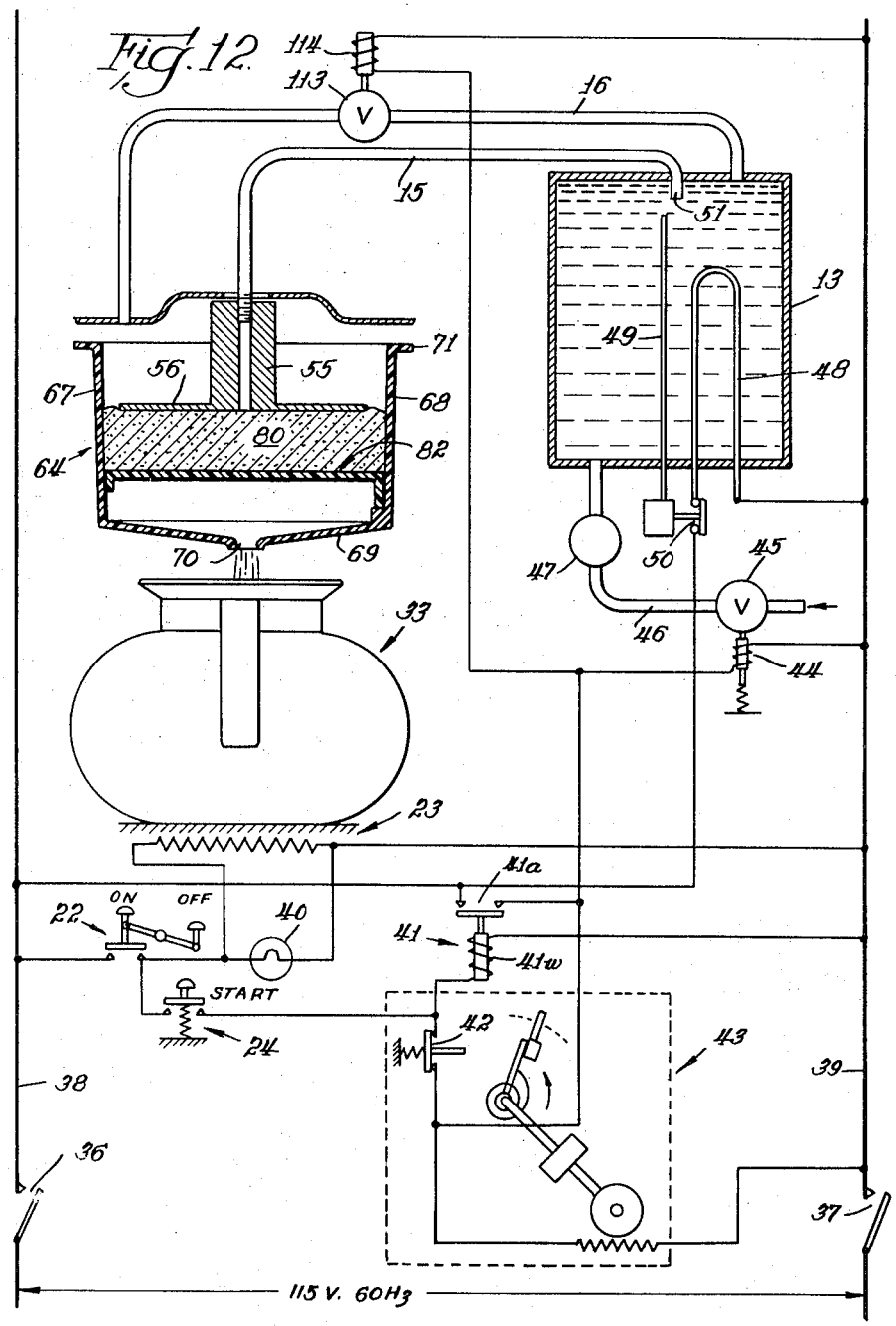
FIG. 12 shows, diagrammatically, the circuit connections that can be employed when the coffee making machine is adapted for use in connection with the pouch pack.

In FIG. 12 the circuit connections that may be employed for the coffee making machine 10 are illustrated, Here it will be observed that switches 36 and 37 are provided for connecting conductors 38 and 39 across a suitable source of 115v 60Hx current. An indicator lamp 40 is connected across the heating element of the warmer 12 and it is lighted when the control switch 22 is operated to the "on" position. This completes an obvious energizing circuit for the indicating lamp between the conductors 38 and 39. Also it prepares an energizing circuit for the start switch 24.

On momentary operation of the start switch 24 an energizing circuit is completed for winding 41w of a relay that is indicated, generally, at 41 and has normally open contacts 41a. In addition an energizing circuit is completed through normally closed contacts 42 of a timer, shown generally at 43, for intiating the operation of the timer motor and also for energizing a winding 44 of a solenoid valve 45. At comtacts 41a a holding circuit is completed so that it is unnecessary to maintain the start switch 24 in the operated position. The solenoid valve 45 is located in an inlet water line 46 which is connected to a source of cold water under pressure. The cold water flows through a flow regulator 46 into the bottom of the hot water tank 13 where it is heated by a heating element 48 under the control of a thermostat 49 which is provided with contacts 50 for connecting the heating element 48 for energization between the conductors 38 and 39.

It will be understood that the solenoid valve 45 is opened for a time depending upon the setting of the timer 43. At the end of the present time interval, contacts 42 are opened, relay winding 41w is deenergized along with winding 44. The solenoid valve 45 is closed and further flow of cold water into the tank 13 is stopped. However, hot water continues to flow through the discharge hot water line 15 until the level in the tank 13 is lowered to the inlet end 51 of the discharge hot water line 15. This siphon action continues due to the fact that the air vent line 16 is opened to the atmosphere. As will appear hereinafter, provision is made for closing of the air vent line 16 when the coffee making machine 10 is employed for coffee making purposes in connection with a pouch pack.

Referring to FIGS. 3, 4 and 5 it will be observed that provision is made for converting the coffee making machine 10 for use in connection with a pouch pack containing ground coffee. For this purpose there is provided a rectangular adapter plate 53 which is arranged to be inserted on the funnel supporting rails 27 in place of the funnel 28. The adapter plate 53 may be formed of stainless steel and is provided with a central opening 54 through which a hexagonal nozzle 55 extends. The upper end of the nozzle 55 is threaded unto the discharge end of the hot water line 15 in lieu of the spray head 31. At its lower discharge end the nozzle 55 carries a circular plate 56 which is arranged, as described in more detail hereinafter, to engage a substantial portion of the pouch pack for the purpose of insuring that the hot water flows through it rather than around it.

Mounted on the under side of the adapter plate 53 is a funnel support that is indicated, generally, at 57. The funnel support 57 may be formed of stainless steel and may be suitably secured, as by spot welding, to the under side of the adapter plate 53. The funnel support 57 has an intermediate flat section 58 which underlies the under side of the adapter plate 53. The funnel support 57 has a relatively short front arm 59 and a relatively long rear arm 60 that are arranged to detachably mount a plastic pouch pack funnel which is indicated, generally, at 63. The plastic pouch pack funnel 62 has a body portion, indicated generally at 64, that is generally rectangular in cross section. The body portion 64 is formed by a front end 65 and a rear end 66 which diverge slightly upwardly and by a left side wall 67 and a right side wall 68 which also diverge slightly upwardly. They are interconnected by a bottom wall 69 which is inclined downwardly to an aperture 70 through which coffee extract can flow into the beaker 33. A lateral flange 71 surrounds the upper edges of the ends 65 and 66 and the side walls 67 and 68 as shown more clearly in FIG. 6.

For detachably supporting the pouch pack funnel 63 on the funnel support 57 a frame 73 is formed integrally with the front end 65 so as to provide a rectangular opening 74 through which the front arm 59 can extend as illustrated in FIG. 9. At its lower end the front arm 59 has a hook portion 75 that is arranged to underlie a shoulder 76 of the frame 73. A handle 77 extends from the frame 73 to facilitate manual manipulation of the plastic pouch funnel 63. Also as shown in FIG. 9 the lower end of the rear arm 60 of the funnel support 57 is provided with a shoulder 78 that is arranged to underlie a portion of the bottom wall 69. In this manner the plastic pouch pack funnel 63 is securely held in position.

FIG. 5 illustrates at 80 a conventional pouch pack of ground coffee. It will be understood that the ground coffee is enclosed in a water permeable membrane 81 which acts as a filter so as to permit the outflow only of coffee liquor through the aperture 70 in the bottom wall 69 of the pouch pack funnel 63.

It is desirable that the pouch pack 80 be spaced from the upper surface of the bottom wall 69 in order to prevent closing off of the aperture 70. For this purpose there is provided a removable rectangular plastic plate that is indicated, generally, at 82 in FIG. 5. The corners 83 of the removable plate 82 are omitted so as to provide for the flow of coffee liquor from the upper side of the removable plate 82 at the corners of the pouch pack funnel 63. Ribs 84 extend inwardly from the corners of the pouch pack funnel 63 toward the corners of the removable plate 82 for the purpose of preventing the corners of the pouch pack 80 from extending fully into these corners and thus shutting off the flow of coffee liquor through the triangular openings otherwise provided.

As pointed out above the pouch pack 80 may come in different thicknesses depending upon the amount of ground coffee that is to be employed. However, the lateral dimensions remain the same for substantially filling the entire opening defined by the ends 65 and 66 and side walls 67 and 68 of the pouch pack funnel 63. As shown in FIGS. 9, 10 and 11 the relation between the pouch pack funnel 63 and the removable plate 82 is such that the latter can be positioned in three different locations so as to provide three different distances between the underside of the circular plate 56 and the upper surface of which ever side is up of the removable plate 82. FIG. 9 shows the removable plate 82 at its greatest elevation so that a minimum distance is provided between the upper surface of the plate 82 and the under surface of the circular plate 56. FIG. 10 shows an intermediate position of the removable plate 82 and FIG. 11 shows the plate 52 in its lower most position for the purpose of accommodating a pouch pack 80 of maximum thickness.

Figure 7:
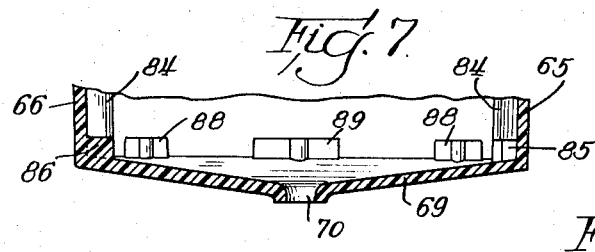
FIG. 7 is a vertical sectional view of the lower portion of the funnel, taken generally along line 7—7 of FIG. 6.
Figure 8:
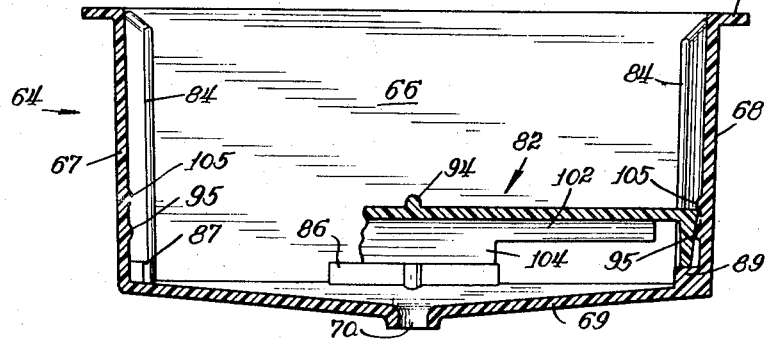
FIG. 8 is a vertical sectional view taken generally along line 8—8 of FIG. 6.

The construction of the pouch pack funnel 63 is illustrated in detail in FIGS. 6, 7 and 8. Here it will be observed that a pair of spaced upstanding relatively long projections 85 is provided along the lower inner surface of the front end 65. Along the lower portion of the inner side of the rear end 66 there is provided a single upstanding relatively long projection 86 which is intermediate the projections 85 on the opposite front end 65. These projections 85 and 86 provide shoulders for supporting the removable plate 82 in different positions.

Along the lower inner surface of the left side wall 67 there is formed a pair of spaced upstanding relatively short projections 87. A pair of similar projections 88 is located in relatively widely spaced relation along the lower end of the inner surface of the right side wall 68. Between the projections 88 there is located a single upstanding relatively long projection 89. It will be understood that the tops or upper surfaces of the projections 85-89 all are located in the same elevation.

Referring now to FIG. 11 it will be recalled that this shows the position of the removable plate 82 in its lower most position in the pouch pack funnel 63. In this position under surface 93 of the removable plate 82 bears against the upper surfaces of the projections 85-89. In this position a depending rib 94 overlies the upper surface of the inclined bottom wall 69. The rib 94 extends transversely of the surface 93 midway its ends. Otherwise the surface 93 is a plane surface. In the position of the removable plate 82 shown in FIG. 11 detents 95 on the side walls 67 and 68 overlie the upper surfaces of an upstanding rib 96 located at one end of the removable plate 82, FIG. 5. The upstanding rib 96 has intermediate its ends an upstanding projection 97 which is located between a pair of spaced projections 99, FIG. 5, at the other end. Shoulders 100 extend from the projections 99 for interfitting with the detents 95 on the right side wall 68 as will be understood readily.

The projections 97 and 99 are employed when the removable plate 82 is reversed from its position shown in FIG. 11 to either of the positions as shown in FIGS. 9 and 10. Referring to FIG. 5 it will be observed that ribs 101 and 102 depend from opposite sides of the removable plate 82 with their surfaces having the same elevation as that of the rib 96 and shoulders 100. Located along the rib 101 is a pair of spaced depending projections 103 while a single depending projection 104 extends from the rib 102. It will be understood that the surfaces of the projections 97, 99, 103 and 104 are at the same elevation or are located in the same plane.

As shown in FIG. 10, for the intermediate position of the removable plate 82, the projection 104 is located adjacent the lower portion of the front end 65. In this position the projection 104 is located between the upstanding projections 85, FIG. 6, of the pouch pack funnel 63 while the depending projections 103 straddle the projection 86. Also the lower surface of the rib 96 bears against the upper surfaces of the projections 87 while the lower surfaces of the shoulders 100 bear against the upper surfaces of the projections 88. In this position, as shown in FIG. 10, the upper surface of the removable plate 82 underlies the detents 95.

FIG. 9 shows the removable plate 82 reversed from its position shown in FIG. 10. Here the projection 104 bears against the upper end of the projection 86 while the projections 103 bear against the upper surfaces of the projections 85. Also the lower ends of the projections 99 bear against the upper surfaces of the projections 87 while the lower surface of the projection 97 bears against the upper surface of the projection 89. In the upper most position of the removable plate 82, the ends underlie the detents 105 so that the removable plate 82 is securely held in position in the pouch pack funnel 63.

With a view to facilitating the removal of the plate 82 from the pouch pack funnel 63 there is provided a tab 108, FIG. 5, which has a rib 109 at its distal end. It is hinged to the removable plate 82 by a flexible section 110. Thus the tab 108 can extend to one side or the other side of the plate 82.

It will be understood that the removable plate 82 is positioned in the pouch pack funnel 63 as shown in FIG. 9, 10, or 11 depending upon the thickness of the pouch pack 80. The pouch pack funnel 63 then is moved upwardly to telescope the front arm 59 with the frame 73, as shown in FIG. 9, and the rear end 66 along the rear arm 60. The pouch pack funnel 63 can be manipulated by one hand of the operator and, when in its uppermost position, it is moved inwardly slightly so that the hook portion 75 underlies the shoulder 76 while the shoulder 78 underlies the adjacent portion of the bottom wall 69. The upper surface of the pouch pack 80 is forced against the under side of the circular plate 56. On flow of hot water through the pouch pack 80, the ground coffee expands and forces the upper side of the pouch pack 80 against the circular plate 56.

When the coffee making machine 10 is operated in the mode employing the pouch pack 80 and associated apparatus, it is necessary to shut off the air vent line 16 in order to force all of the hot water to flow through the discharge hot water line 15. For this purpose a shut off valve 113 is inserted in the air vent line 16 as illustrated in FIG. 12. A winding 114 is arranged to close the shut off valve 113 when the solenoid valve 45 is opened. It will be observed that the winding 114 for the shut off valve 113 is connected in parallel with the winding 144. Thus the solenoid valve 45 is opened to permit the flow of cold water under pressure to the hot water tank 13 at the same time that the shut off valve 113 is closed to prevent flow of hot water through the air vent line 16.

From the foregoing it will be apparent that essentially the same major parts of the convertible coffee making machine 10 are employed for either mode of operation. If only the funnel filter operation, shown in FIGS. 1 and 2 is to be used, then the shut off valve 113 is omitted and of course the adapter plate 53 and associated parts are not used. To convert the coffee making machine 10 to the funnel-pouch mode, the shut off valve 113 and winding 114 therefore are employed together with the adapter plate 53 and the pouch pack funnel 63.

In the funnel-pouch mode the pressure applied to the pouch pack 80 is only the pressure of the incoming cold water flowing through the inlet water line 46. This pressure exists only as long as the solenoid valve 45 is open and the shut off valve 113 is closed. At the end of the brewing cycle the valve 45 is closed and the valve 113 is opened. This insures that only atmospheric pressure is applied to the system and particularly to the water tank 13. Normally then a non-pressure system is provided except for the brief period when the valve 113 is closed.

I claim:

1. A funnel for holding a pouch pack of ground coffee comprising: a rectangular body portion open at the top and having an apertured bottom wall, and a removable rectangular plate overlying and spaced from said bottom wall for underlying said pouch pack, said bottom wall having a pair of upstanding spaced projections along one side and an upstanding projection along an opposite side intermediate said spaced projections, and said plate having spaced projections along one edge and a projection along an opposite edge intermediate said spaced projections along said one edge, in one position of said plate registering with said projections on said bottom wall to space said plate a corresponding distance from said bottom wall and in another position in non-registering relation to space said plate a different distance from said bottom wall.

2. A funnel according to claim 1 wherein detents extend inwardly from side walls of said body portion to hold said plate in any of its operative positions.

3. A funnel for holding a pouch pack of ground coffee comprising: a rectangular body portion open at the top and having an apertured bottom wall, and a removable rectangular plate overlying and spaced from said bottom wall for underlying said pouch pack, corner portions of said plate being omitted for flow of coffee extract therepast.

4. A funnel according to claim 3 wherein ribs extend inwardly from the corners of said body portion toward said corner portions of said plate to space the corners of said pouch pack therefrom.

5. A funnel for holding a pouch pack of ground coffee comprising: a rectangular body portion open at the top and having an apertured bottom wall, a removable rectangular plate overlying and spaced from said bottom wall for underlying said pouch pack, and a flexible tab is integral with said plate to facilitate removal thereof from said body portion.

* * * * *